Oct. 13, 1970 A. SANDERSON ET AL 3,534,387
ELECTRON BEAM WELDING
Filed April 23, 1968 3 Sheets-Sheet 1
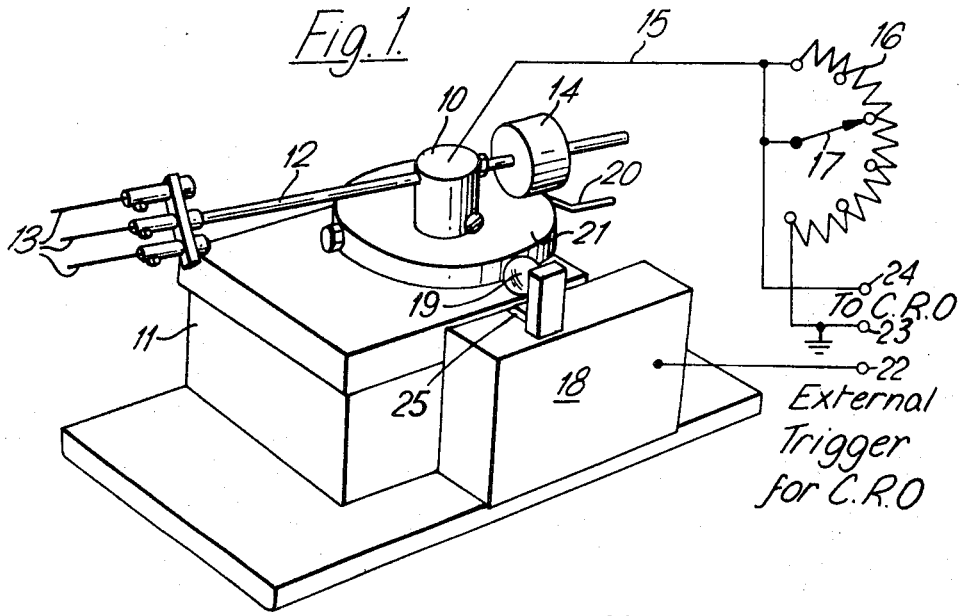
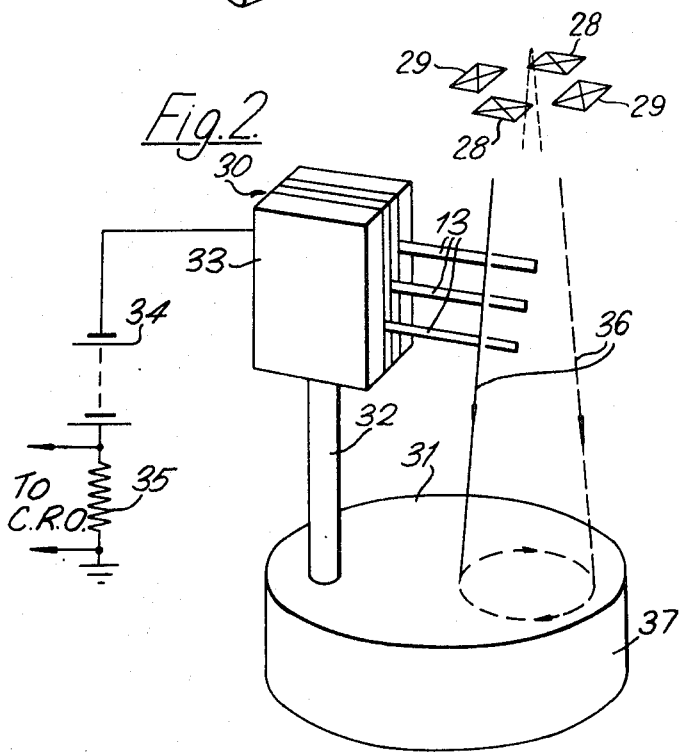
Inventors
Alan Sanderson
Martin James Adams
By
Kenyon, Palmer & Estabrook
Attorneys

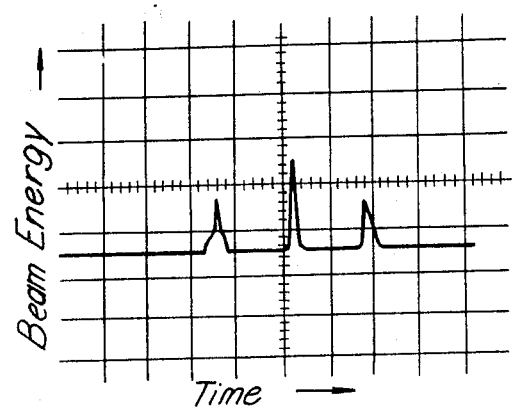

United States Patent Office 3,534,387
Patented Oct. 13, 1970

3,534,387
ELECTRON BEAM WELDING
Alan Sanderson, Shudy Camps Park, Cambridge, and Martin J. Adams, Linton, Cambridge, England, assignors to The Welding Institute, Abington, Cambridge, England, a British body corporate
Filed Apr. 23, 1968, Ser. No. 723,435
Claims priority, application Great Britain, Apr. 25, 1967, 19,062/67
Int. Cl. B23k 9/00
U.S. Cl. 219—121                               9 Claims

ABSTRACT OF THE DISCLOSURE

To focus an electron beam in electron beam welding apparatus, a probe is rotated through the beam or the beam is given a rotary motion in which it crosses the probe, and an electric signal having variations corresponding to the cyclic intersections is taken either from the probe or from a collector arranged to intercept the beam after it has passed the probe. This signal is applied to an oscilloscope or to an automatic focusing system controlling the focus current.

---

In electron beam welding, the beam characteristics which are of importance are beam diameter at focus, beam energy density distribution and the rate of convergence of the electron beam. Because of the high energy densities involved it is difficult to measure directly any of the characteristics of the electron beams and it is not possible to reduce the beam energy density to measure the other characteristics because these will alter as a consequence of the power change.

In order to be able to produce and reproduce the optimum weld it is necessary to focus the electron beam accurately to a predetermined position within the material to be welded. It is customary for focusing to be carried out visually by the operator, using either the workpiece itself or a comparable metal member, since the object at the focus will be subjected to intense heating. The operator observes through a telescopic optical system the point at which the electron beam strikes the workpiece or other metal member and adjusts the focus current until the smallest bright spot is seen in the field of view. However, the assessment of the size of the boiling metal spot is not easy even when, to avoid formation of a large weld pool by heat conduction, the focusing block is moved continuously. Consequently, the quality of consecutive welds is unlikely to be consistent and will vary from one operator to another. In addition, the operator has no means of telling whether the machine is performing as well as on a previous occasion and therefore although he may obtain the best focus he cannot be sure that the beam characteristics, including its diameter at focus, are the same as they were on the previous occasion.

A further difficulty is that the achievement of a focus point at the surface of the metal workpiece does not necessarily lead to the most desirable weld contour.

Consequently, although electron beam welding has many attractive features and is capable of producing welds of very high quality, the optimum working conditions can only be determined and maintained with practical trials carried out by skilled operators.

According to the present invention, a thin metallic probe is located within the electron beam welding apparatus and the probe and the electron beam generated within the apparatus are given a relative motion of a cyclic nature such that the probe is passed through the beam in each cycle, and an electrical signal derived from a collector member intercepting the beam and having variations consequent upon the cyclic intersection of the beam and probe is used to operate an indicator or to actuate automatic focusing means. The collector member may be the probe itself or a metallic member positioned to receive the beam after it has passed the probe, the signal from such a collector being the inverse of the signal which would be derived from the probe. The probe may be rotated to achieve the relative motion between itself and the beam or the probe may be stationary and the beam may be given a rotary or oscillatory motion. The probe should be mounted so that only an edge of the probe is directly exposed to the electron beam and the speed of the relative motion should be such as to prevent overheating of the probe. Typically, the rate of relative motion is such that the probe is in the beam only for about $\frac{1}{30,000}$ second. It is advantageous to use a multiple probe having arms spaced in the direction of travel of the electron beam so that different arms will cut the beam at different points and the electrical signals from the different arms, when displayed on an oscilloscope, will give traces which will indicate by their amplitude and width the changing beam intensity and width as the beam passes from the first probe in its path to the last. These probes are preferably also displaced with respect to one another in the direction of the relative motion of the probe and beam to cause a time displacement in the signals which they produce.

The oscilloscope traces derived from any probe intersecting the electrons represents an approximate energy density profile of the beam at the point of intersection and by adjusting focus coil current on the electron beam machine it is possible to obtain a desired beam energy distribution. At focus, the optimum energy distribution is that which has the greatest amplitude and smallest beam width.

An alternative to the oscilloscope method of presenting the probe signal giving high sensitivity is the use of a peak sensing voltmeter. Automatic control of focus coil current may be obtained using servo-mechanism techniques by sensing a maximum from the voltmeter output or obtaining null balance with a reference voltage. As an example, a servo-mechanism may adjust the focus current to try to maintain a given pulse width or may adjust the focus current continuously in a direction such as to increase the amplitude of the signal from the central probe, in the triple-arm probe arrangement described above, relative to the amplitudes of the signals from the outer probes.

If the null balance servo is used, the reference voltage may correspond to a given distance above focus, so that a rotating probe can be used to monitor focus during a welding operation.

It may in some cases be advantageous to arrange for probe arms to be passed through the electron beam in directions such that the resulting signals from these arms indicate the beam energy density distribution in two mutually perpendicular directions in the plane in which the arms sweep through the beam.

Some forms of electron beam welding apparatus have a two-lens system. In such apparatus there appears to be a crossover in the electron beam between the top and bottom lenses and the probe can therefore be arranged to rotate at the level at which the crossover is required for focus at the workpiece and the focus current can be adjusted for minimum crossover beam diameter. With such an arrangement the probe can be used for continuous monitoring of the focusing of the beam during the welding operation itself.

One advantage of the arrangement employing a stationary probe and moving the beam over the probe is that there is no need to have a rotating shaft or motor within the housing of the beam welding apparatus.

In order that the invention may be better understood, some examples of apparatus embodying the invention will now be described with reference to the accompanying drawings, in which:

FIG. 1 illustrates diagrammatically a rotating probe assembly, for insertion in electron beam welding apparatus;

FIG. 2 shows an arrangement employing a stationary probe and a rotating electron beam;

FIG. 3 illustrates the kind of trace which is obtained on an oscilloscope connected to probe assemblies of the kinds shown in FIGS. 1 and 2;

Figure 4:
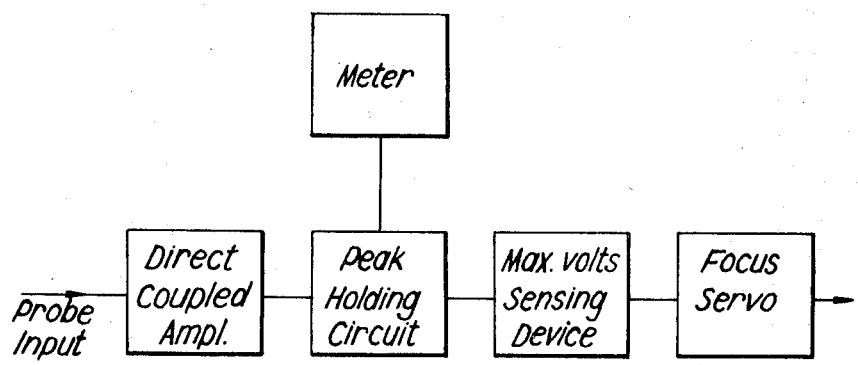
FIG. 4 is a block diagram of an automatic focusing circuit.

In the arrangement shown in FIG. 1, a shaft 10 is driven by an induction motor housed in a steel case 11 and carries a probe-supporting rod 12 extending perpendicularly to the axis of rotation of the shaft. On one end of the rod 12 three probes 13 are mounted, the probes being displaced with respect to one another both vertically and laterally. The axis of the electron beam is parallel to the axis of rotation of the shaft 10 and consequently the vertical displacement of the probes provides the beam divergence information and the lateral displacement provides a time interval between signals from the individual probes. A counterweight 14 is mounted on the other end of the rod 12. An electric signal is applied by way of conductor 15 to one end of a rheostat 16, the other end of which is connected to an earthed output terminal 23. The wiper 17 of the rheostat is connected to the second output terminal 24, which supply a signal for the vertical deflection electrodes of a cathode ray oscilloscope.

It is necessary to provide the oscilloscope with a reference signal to trigger its sweep in the horizontal direction. This reference signal is provided by a phototransistor housed within the box 18, which normally receives light from a lamp 19 through a slit 25 in the box, the light being interrupted at a fixed point in each rotation of the shaft 10 by a shutter arm 20 mounted on a disc 21 which rotates with the shaft 10.

With such an arrangement, the probe traces are triggered with respect to a fixed reference point in time and consequently relative movement of the electron beam with respect to the component to be welded can be detected. Such movement is sometimes found in beam welding machines which have a flucturating accelerating voltage.

An alternative arrangement for triggering the oscilloscope sweep is to use a signal from a dummy probe which passes through the electron beam ahead of the probes 13. Thus the X deflection plates of the oscilloscope receive a time base signal triggered by a reference pulse from the rotating probe assembly (from terminal 22 in FIG. 1) and the Y deflection plates of the oscilloscope receive the pulse signal which results each time a probe passes through the electron beam and collects electrons which are earthed through the adjustable resistor.

In the arrangement shown in FIG. 2, the probe assembly 30 is stationary and is mounted on a heat sink 31 through an insulator 32. As in the case of the probe assembly of FIG. 1, three probes 13 are laterally and vertically displaced with respect to one another. In this case, an electron beam represented by the line 36 is given a continuously repeated deflection for example by deflection coils schematically indicated at 28 and 29 in FIG. 2, such that it sweeps out a circular path on a beam heat sink 37 and such that in sweeping out this circular path it intersects the probes once. The probes, which are also mounted in a metal block 33 constituting a heat sink, are electrically connected to earth through a biasing battery 34 and a resistor 35 and the voltage across the resistor is taken to the Y deflection plates of the oscilloscope. In this case, the sweep trigger signal is conveniently derived from the source of deflection signals for the rotating beam.

A typical trace obtained from a triple arm probe assembly, of the kind shown in FIGS. 1 and 2, is illustrated in FIG. 3. In FIG. 3, the X axis represents time and the Y axis integrated current density. The width of each pulse at its base represents the beam diameter. It will be seen that the trace shown in FIG. 3 represents a good focus in that the signal from the central probe indicates a high energy density and a small beam diameter.

The width which the probe presents to the beam should be appreciably smaller than the effective electron beam diameter; given this condition, the peak amplitude and overall duration of the signal from the probe are both very sensitive to small changes in energy density distribution and beam diameter. We prefer to use a ribbon presenting its edge to the beam, as a ribbon is able to withstand electron bombardment for longer times than the same thickness of wire, because of its greater cross-sectional area and hence greater thermal conductance and higher thermal capacity.

We prefer to use tungsten for the material of the probe, since it has a high melting point and a high boiling point combined with a good thermal conductivity. In addition, it is readily available in the form of fine wire and ribbon. Copper and platinum are other materials which can be used but are less suitable above moderate beam powers.

A bias may be applied to the probe to suppress secondary emission from the probe as a consequence of its bombardment by the electron beam. If the beam diameter or beam current is fluctuating (say, in sympathy with a machine supply ripple frequency) then the probe device will detect this ripple and show its effect on the beam. For this the rate of oscillation of the probe with respect to the beam is arranged to be slightly different to the expected machine ripple frequency.

Automatic control of focus can be achieved by the circuit shown diagrammatically in FIG. 4. The probe input is applied through a direct-coupled amplifier to a peak-holding circuit, for example a diode-capacitor circuit. The peak voltage at each sweep is applied to a maximum voltage-sensing device which senses a change of polarity in the slope of the signal resulting from the succession of peak voltages, for example by determining the first and second derivatives of the signal. Whenever the slope changes in polarity a signal is applied to a focus servo to cause it to adjust coil current in a sense such as to reverse the sense of change of focus. Thus the beam focus continuously oscillates about its desired position. As soon as it moves away from focus in a first sense the direction of change is reversed and as soon as it has passed through focus and moves away from focus in the opposite sense, the direction of change is again reversed. Control systems of this kind have been described in chapter 15 (Optimalising Control) of "Engineering Cybenetics" by H. S. Tsien, published by McGraw-Hill in 1954; and in an article entitled "Peak Holding Optimalising Servo" by R. L. Maybach in "Instrument and Control Systems," vol. 36, No. 10 (October 1963), p. 76. In the example shown a meter provides a visible indication of the peak values.

In an alternative automatic focusing system the output of the peak holding circuit is applied to a null balance servo fed with a reference voltage and the null balance servo controls the focus coil current. This system can be used when the beam is sensed at a point above the desired focus, the reference voltage being correlated to the distance of the probe above the workpiece.

Figure 5:
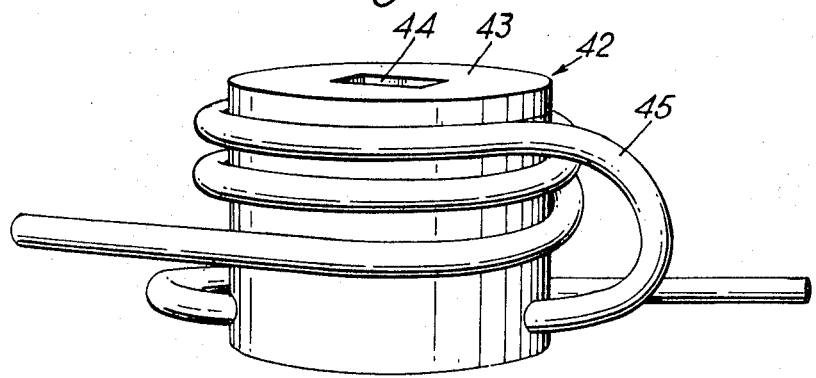
FIG. 5 shows a collecting cup which can be used when focusing prior to welding.

When the beam is being focused prior to a welding operation, we place a collecting cup 42 (FIG. 5) having a lid 43 with a central aperture 44 in the path of the beam so that the beam passes through the aperture; in the example shown the cup is surrounded by a water tube 45. We find that with such an arrangement the direct ion emission from the collector is reduced. It will be obvious that a record of current picked up from the cup or any other collector member placed after the probe in the path of the beam will be the reverse of the signal collected from the probe as described previously. This is because when the probe intercepts the beam no signal reaches the hole in the cup.

The use of the probe and the relative motion between the beam and probe enables the focus to be determined with good precision and permits the obtaining of a high depth/width ratio for the molten metal; this is found to be desirable for deep penetration characteristics. A given amount of defocusing can be introduced if required. Soft focus beams are desirable for a smoothing or cosmetic path after the main welding path and can also be used for some joint configurations and thin sheet applications.

In application Ser. No. 723,528, filed Apr. 23, 1968, in the name of Peter Atherton Mercer and also assigned to The Welding Institute, there is disclosed and claimed a focus monitoring system which is used during a beam welding operation and which involves brief periodic deflections of the beam from the workpiece to cause it to traverse the probe.

We claim:

1. In electron beam welding apparatus, a probe in the form of a strip, having broad surfaces and narrow edges, of a metal of good thermal conductivity mounted adjacent the path of the electron beam at a point in the path close to the focus of the beam; means for achieving a relative motion of a cyclic nature between said probe and the electron beam, said beam being of welding intensity, so that the probe and the beam contact each other for a time of the order of $1/30,000$ second in each cycle of the relative motion, said probe being mounted so that the narrow edge of the strip is in a plane transverse to the beam direction, whereby said narrow edge of the strip is presented to the beam and the broader surfaces of the strip provide good heat dissipation; and means for deriving an electric signal having variations consequent upon the cyclic intersection of the beam and said probe and indicative of the beam concentration at the level of intersection of the beam and said probe.

2. Apparatus in accordance with claim 1, including means responsive to the said electric signal to adjust the magnitude of the beam focusing current, when the beam departs from focus at a desired point, in a sense such as to restore the beam towards focus at the said point.

3. Apparatus in accordance with claim 1, in which the probe is a strip of tungsten.

4. Electron beam welding apparatus as defined by claim 1 and including a beam intercepting collection member arranged in the path of the beam downstream of the probe to provide an electric signal having variations dependent upon the cyclic interception of the beam at the level of interception of the beam and the probe.

5. Electron beam welding apparatus as defined by claim 1 in which said probe is mounted on a stationary support adjacent the path of the electron beam and which includes means for deflecting the electron beam in a cyclic manner so that it crosses said stationary probe in each cycle of deflection.

6. Electron beam welding apparatus as defined by claim 1 in which means are provided for rotating said probe through said electron beam in each cycle of said relative motion.

7. In an electron beam welding apparatus, the combination comprising: a probe assembly mounted adjacent the path of the electron beam, said probe assembly comprising at least three probes which are displaced from one another in the direction of travel of the electron beam; means for achieving a relative motion of a cyclic nature between said probe assembly and the electron beam, said beam being of welding intensity, so that said probe and the beam contact each other for a time of the order of $1/30,000$ second in each cycle of the relative motion; and means for deriving from said probe assembly, electric signals each of which has variations consequent up the cyclic intersection of the beam and the corresponding one of said probes which is indicative of the energy distribution within the beam at the level of intersection of the beam and said probe, the signals thereby representing the beam energy distribution at at least three different levels and thereby indicating the location of the beam focus.

8. Apparatus in accordance with claim 7, in which the probes are also displaced from one another in the direction of relative motion of the probe and beam so that the resulting signals from the probes are displaced in time.

9. In electron beam welding apparatus, the combination comprising: a probe mounted on a stationary support so that the probe is adjacent the path of the electron beam, said beam being of welding intensity; means for deflecting the electron beam in a cyclic manner so that it crosses said stationary probe in each cycle of deflection, said probe and beam contacting each other for a period of the order of $1/30,000$ second each cycle; and means for deriving an electric signal having variations consequent upon the cyclic intersection of the beam and probe and indicative of the energy distribution within the beam at the level of intersection of the beam and probe.

References Cited

UNITED STATES PATENTS

| | | | |
|---|---|---|---|
| 3,140,379 | 7/1964 | Schleich et al. | |
| 3,146,335 | 8/1964 | Samuelson. | |
| 3,148,265 | 9/1964 | Hansen. | |
| 3,152,238 | 10/1964 | Anderson | 219—121 |
| 3,207,982 | 9/1965 | Rose. | |
| 3,268,812 | 8/1966 | Meyer et al. | |
| 3,258,576 | 6/1966 | Schleich et al. | 219—121 |
| 3,326,176 | 6/1967 | Sibley | 219—121 |
| 3,371,274 | 2/1968 | Davey | 219—121 |
| 3,408,474 | 10/1968 | Downing | 219—121 |

JOSEPH V. TRUHE, Primary Examiner

L. A. ROUSE, Assistant Examiner